(12) United States Patent
Gödel et al.

(10) Patent No.: US 6,612,342 B2
(45) Date of Patent: Sep. 2, 2003

(54) FLEXIBLE PIPE ELEMENT

(75) Inventors: Frank Uwe Gödel, Stutensee (DE); Georg Salzer, Waghäusel (DE)

(73) Assignee: IWKA Balg- und Kompensatoren-Technologie GmbH, Stutensee (DE)

( * ) Notice: Subject to any disclaimer, the term of this patent is extended or adjusted under 35 U.S.C. 154(b) by 84 days.

(21) Appl. No.: 10/181,456

(22) PCT Filed: Oct. 2, 2001

(86) PCT No.: PCT/EP01/11375

§ 371 (c)(1),
(2), (4) Date: Jul. 18, 2002

(87) PCT Pub. No.: WO02/29302

PCT Pub. Date: Apr. 11, 2002

(65) Prior Publication Data

US 2003/0024584 A1 Feb. 6, 2003

(51) Int. Cl.$^7$ ................................................ F16L 11/00
(52) U.S. Cl. ..................... 138/118; 138/121; 138/114; 138/148; 138/123
(58) Field of Search ................. 138/118, 121, 138/114, 135, 122, 148, 123

(56) References Cited

U.S. PATENT DOCUMENTS

| | | | |
|---|---|---|---|
| 2,707,117 A | * 4/1955 | Fentress et al. | ............. 285/226 |
| 3,204,666 A | 9/1965 | Paetz | ........................ 138/135 |
| 5,456,291 A | 10/1995 | Kunzmann | ................... 138/121 |
| 5,660,419 A | * 8/1997 | Kim | ........................... 285/226 |
| 5,901,754 A | * 5/1999 | Elsasser et al. | ............. 138/118 |
| 6,062,268 A | * 5/2000 | Elsasser et al. | ............. 138/121 |
| 6,116,287 A | * 9/2000 | Gropp et al. | ................ 138/114 |
| 6,125,889 A | * 10/2000 | Elsasser et al. | ............. 138/118 |
| 6,155,303 A | * 12/2000 | Krawietz et al. | ........... 138/135 |
| 6,220,023 B1 | * 4/2001 | Ezzeddini et al. | ............ 60/322 |
| 6,230,748 B1 | * 5/2001 | Krawietz et al. | ........... 138/121 |

FOREIGN PATENT DOCUMENTS

| | | |
|---|---|---|
| DE | 37 02 243 | 8/1988 |
| DE | 40 16 453 | 11/1991 |
| DE | 44 17 407 | 11/1995 |
| DE | 198 48 451 | 4/2000 |
| EP | 0 289 815 | 11/1988 |
| EP | 0 561 211 | 9/1993 |
| EP | 1 010 872 | 6/2000 |

* cited by examiner

Primary Examiner—Patrick Brinson
(74) Attorney, Agent, or Firm—Paul Vincent

(57) ABSTRACT

The invention concerns a flexible pipe element, in particular for exhaust pipes of combustion engines of motor vehicles, with a helically threaded or ring-corrugated bellows, at least one strip wound hose which is coaxially adjacent to the bellows and which is helically wound or comprises several annular segments, at least one spacer which is disposed locally between the bellows and the strip wound hose and a knitted tube disposed on the outside, wherein the pipe element has an overall maximum rigidity of 5 N/mm.

39 Claims, 4 Drawing Sheets

FLEXIBLE PIPE ELEMENT

Translation of PCT/EP01/11375 as filed on Oct. 2, 2001.

BACKGROUND OF THE INVENTION

The invention concerns a flexible pipe element, in particular for exhaust pipes of combustion engines of motor vehicles.

Flexible pipe elements of this type generally comprise a helical-shaped or corrugated bellows and a strip wound hose which is helically wound or which comprises several annular segments and which is coaxially adjacent to the bellows, wherein the helical winding or the annular segments of the strip wound hose have a substantially S-shaped cross-section by means of which axially neighboring elements of the helical winding or axially neighboring annular segments of the strip wound hose engage one another. They are installed as intermediate pieces in the motor vehicle exhaust pipe which is usually fixed to the vehicle floor, optionally using flexible support parts to accept movement and vibration produced by the elastically suspended engine and by changes in length due to temperature etc. and to prevent same from being passed on to neighboring structural components.

Particularly disadvantageous thereby is the limited freedom of motion of the pipe element caused by the strip wound hose. This deteriorates the decoupling properties of the pipe element when the strip wound hose has reached its maximum possible axial length and leads to transfer of load changes in the engine to the exhaust system causing unpleasant noise. The limited mobility of these pipe elements also usually requires an exhaust system which is displaceably suspended from the underbody of the motor vehicle which can accept extreme motion leading to blocking of the pipe element.

Known pipe elements (EP 0 903 528 A1, EP 0 709 558 A1, DE 296 09 293 U1) furthermore mostly comprise a metal braid disposed on the outside to protect the bellows from exterior mechanical influence and excessive lengthening. Disadvantageously, such a braid is radially extended or retracted when the pipe element becomes longer or shorter. When the braid adjoins e.g. the bordering bellows, the pipe element is additionally blocked from further axial extension and also clearly hardened against lateral and angular motions such that oscillating motions are transferred to the exhaust pipe of the motor vehicle when the pipe element is in this state. If the braid is radially separated from the neighboring bellows, it could strike the bellows and/or neighboring vehicle parts in response to transmitted engine vibrations to produce unpleasant noise.

EP 0 681 096 A1 describes a flexible pipe element comprising a bellows wherein the outer metal braid is replaced by knitted fabrics, thereby preventing the metal braid from generating disturbing striking noises. The knitted fabric can also softly support axial motion of the bellows since the mesh can be displaced in both tension and compression directions within limits which are relatively soft. However, in particular the bellows of such a pipe element may fail prematurely since the knitted fabric alone provides insufficient support. An inner pipe is preferably provided to protect the bellows and is coaxially surrounded by the bellows. This considerably limits the motion of the pipe element, in particular with respect to angular deflection.

DE 296 09 293 U1 describes a flexible pipe element comprising a bellows and a knitted fabric directly surrounding same and an outwardly disposed metal braid. This device shares the above mentioned disadvantages.

DE 198 48 451 A1 describes a flexible pipe element wherein spacers are disposed between the bellows and at least one additional element such as e.g. a strip wound hose or a metal braid to effectively damp the bellows. This pipe element has insufficient mobility for many applications.

It is the underlying purpose of the invention to propose a flexible pipe element which has increased mobility thereby preventing premature failure of the bellows, and at the same time good decoupling properties in the high and low frequency ranges, in particular for small amplitude oscillations and large amplitude load change oscillations of the engine.

SUMMARY OF THE INVENTION

This object is achieved in accordance with the invention with a flexible pipe element, in particular for exhaust pipes of combustion engines of motor vehicles with a helical or corrugated bellows, at least one strip wound hose which is helically wound or has several annular segments and which coaxially adjoins the bellows, at least one spacer locally disposed between the bellows and the strip wound hose and an outwardly disposed tube of knitted fabric, wherein the pipe element has a total stiffness of not more than 5 N/mm.

In the inventive design, the bellows is sufficiently supported by the strip wound hose in the axial and radial directions such that premature failure thereof is safely prevented. Moreover, the total maximum stiffness of the inventive pipe element of 5 N/mm advantageously permits a fixed arrangement of the exhaust system on the underbody of the motor vehicle. This is desired by the automobile industry since thermally or mechanically produced distance and angle changes between the engine and exhaust system are reliably accommodated.

The spacers locally disposed between the bellows and the strip wound hose prevent contact between the bellows and the strip wound hose due to oscillating motion of the motor vehicle and the resulting noise caused thereby as known per se from DE 198 48 451 A1. The local spacers reliably prevent the bellows and the adjacent strip wound hose from striking each other to prevent noise, in particular at resonance frequencies, due to direct collision of these components.

The tube of knitted fabric disposed on the outside protects the flexible pipe element from external influences, such as mechanical loading during assembly and hurled stones during operation, without impairing its motion. A highly flexible tube of knitted fabric of this type abuts the inside adjoining element, e.g. at least on the outer crests of the bellow corrugations and across its entire length such that generation of undesired noise due to oscillating motions is reliably prevented.

As mentioned above, the helical windings or annular segments of the strip wound hose have a substantially S-shaped cross-section by means of which axially neighboring elements of the helical winding or axially neighboring annular segments of the strip wound hose each engage one another. In a preferred embodiment, the substantially S-shaped cross-sectional profile of the helical winding or of the annular segments of the strip wound hose has a central section each end of which has an adjacent bar extending substantially in the axial direction with each bar being joined by an end bar extending towards the central section and disposed substantially in an axial direction, wherein the radial separation between the bars is larger than the radial thickness of the end bars and the axial separation between the central section and the bridges is greater than the axial length of the end bars. This embodiment forms a soft stop between each helical winding or between each of the annular segments of the strip wound hose in an axial and also radial direction to prevent distortion of the bellows due to bending, stretching or compression, etc. On the other hand, the overall length of the pipe element ensures increased mobility in the axial and radial directions since axially neighboring elements or segments of the strip wound hose can move relative to another. In particular angular motion is also possible having a maximum value which depends on the ratio between the radial separation of the bars and the radial thickness of the end bars and on the ratio between the axial separation between the central section and the bridges and the axial length of the end bars of the substantially S-shaped cross-sectional profile. Engagement of the axially neighboring elements of the helical winding or the axially neighboring annular segments of the strip wound hose with axial and radial play also guarantees a considerably increased freedom of motion with respect to axial, radial and angular movements of the pipe element compared to prior art to effect complete decoupling of small amplitude oscillations as well as engine load change oscillations of large amplitude.

The cross-sectional profile is preferably mirror symmetrical with respect to the center of the central section to permit uniform motion of the pipe element in any direction.

While the cross-sectional bars are preferably parallel in the axial direction of the pipe element, the central section is preferably a bridge disposed in a radial direction or a bridge disposed at an angle with respect to the radial direction, wherein, in the latter case, the bridge is preferably inclined in the direction of the bars disposed at the ends thereof.

Depending on the desired mobility of the flexible pipe element, the radial separation of the bars is preferably 1.1 to 3 times, in particular 1.2 to 2 times the radial thickness of the end bars and the axial separation between the central section and the bridges is preferably 1.05 to 1.9 times, in particular 1.1 to 1.8 times the axial length of the end bars.

The spacers are preferably strips and do not substantially change the outer dimensions of the pipe element due to the annular space which is in any event present between the bellows and the strip wound hose. The localized application, in particular in strips is usually sufficient to obtain the desired performance and saves substantial amounts of material compared to spacers which are disposed along the full surface. Due to their strip character, the spacers are also more flexible than a spacer disposed along the entire jacket of a component such that the pipe element is not limited in its axial, lateral and angular motion.

The spacers can be fixed to the bellows and/or the strip wound hose at one or both cylindrical connecting ends of the pipe element e.g. via cylindrical rings, or can be loosely disposed between the bellows and the strip wound hose. The spacers can be fixed, e.g. crimped at both connecting ends of the pipe element to maintain contact and prevent displacement during operation.

The strip spacers can be wound about the additional element in a straightforward fashion. They can be disposed in a radial and axial direction or in a threaded, helical fashion about the jacket of the strip wound hose adjacent to the bellows. The spacers can be disposed symmetrically about the jacket of the strip wound hose adjacent to the bellows and/or, to save material, locally at particularly vibration-sensitive regions of the pipe element, e.g. asymmetrically between the bellows and the strip wound hose.

While the spacers usually occupy a single layer, in a preferred embodiment, the spacers are crisscrossed and/or disposed in two or more layers between the bellows and the strip wound hose to provide optimum damping of the pipe element. Even when the spacers are disposed in several layers, less material is required than for a full-surface spacer in dependence on the separation between the spacer strips. Varying orientation of the strips in e.g. both an axial as well as a helical sense, can optimise damping of the pipe element.

The spacers preferably consist substantially of glass and/or mineral fibers and are preferably formed as knitted fabric, braid or fleece, in particular as fleece strips.

Alternatively or additionally, the spacers can be substantially made from metal, such as wire, metal cushion, expanded metal or sheet metal and metal foam. In this context, "metal foam" is a metal mixed with a foaming agent (and which can therefore be foamed) and can be produced from a metal powder together with a foaming agent such as titanium hydride through heating and compression. If the spacer is made from sheet metal it can preferably be perforated to increase its elasticity. Spacers of plastic material are e.g. also feasible.

The frictional force exerted by the knitted tube on the bellows is preferably only 0.5 to 5 N, in particular approximately 1 to 3 N such that the flexibility of the bellows remains substantially unimpaired with the knitted tube always seating on the bellows. The frictional force can be adjusted e.g. in a simple fashion via the inner diameter of the knitted tube or the normal force it exerts on the bellows.

To reliably fix the knitted tube, it is preferably fixed to the connecting ends of the pipe element, wherein it can preferably be held by cylindrical rings. The cylindrical rings also preferably serve for fixing the bellows, the strip wound hose and optionally the spacers. Fixing of the knitted tube has various advantages not only with regard to the unravelling of the ends of the knitted fabric where the tube is usually cut-off but also to assure the protective function of the knitted tube along the entire length of the bellows as well as providing a soft-tension stop to protect the bellows during stretching.

While the knitted tube preferably consists of metal wire, it can also be produced from temperature-resistant fiber material. The knitted fabric can thereby have one or more threads. Construction of the tube with one or more threads can increase its flexibility and reduce its rigidity.

The meshes of knitted fabric preferably extend substantially in the axial direction of the flexible pipe element. This assures minimal influence on the mobility of the pipe element, in particular in the axial direction since the meshes can be freely displaced towards one another in the axial direction during compression.

The bellows of the inventive pipe element preferably has a rigidity of approximately 2 to 5 N/mm.

Although the strip wound hose can, in principle, be disposed outside the bellows to, in this case, be directly surrounded by the knitted tube, in preferred embodiments the strip wound hose is disposed inside the bellows.

BRIEF DESCRIPTION OF THE DRAWING

The invention is described in more detail below by means of embodiments with reference to the drawing.

DESCRIPTION OF THE PREFERRED EMBODIMENT

Figure 1:
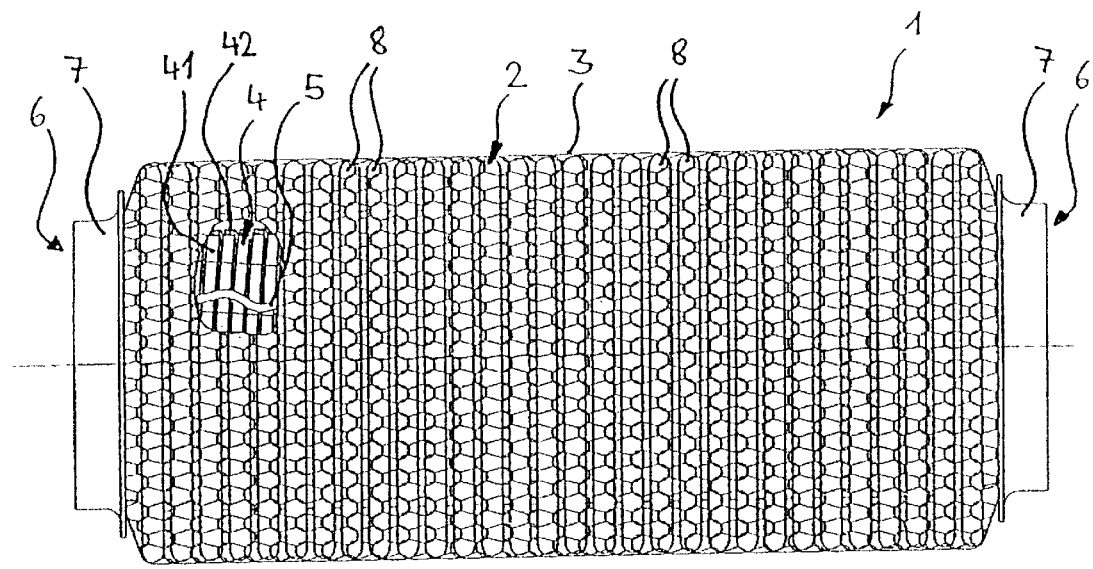
FIG. 1 shows a side view of a flexible pipe element with a strip wound hose disposed on the inside of a bellows and a knitted tube disposed on the outside.
Figure 3:
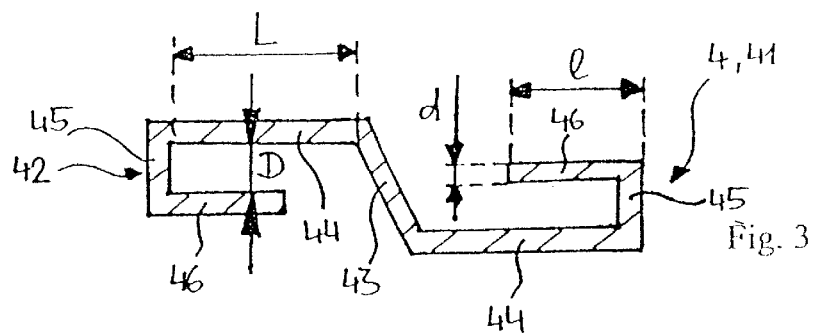
FIG. 3 shows a detailed view of the cross-sectional profile of a winding or an annular segment of a strip wound hose of the pipe element according to FIG. 1 or 2.
Figure 4:
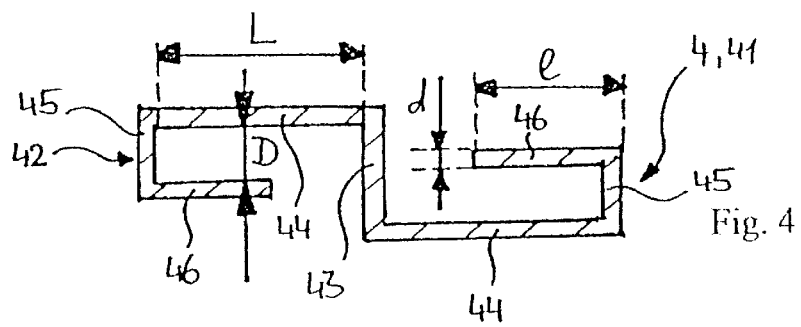
FIG. 4 shows an alternative embodiment of the cross-sectional profile in accordance with FIG. 3.
Figure 5:
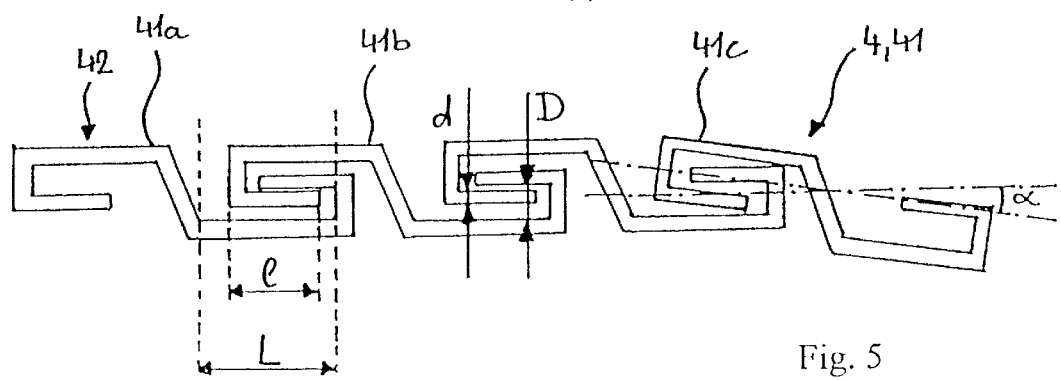
FIG. 5 shows a detailed cross-sectional view of several engaging windings or annular segments of the strip wound hose in accordance with FIG. 3.

The flexible pipe element 1 shown in FIG. 1 comprises a corrugated bellows 2 (a portion of which is broken away) and a knitted tube 3 surrounding same which exerts e.g. a frictional force of approximately 2N onto the bellows (2). A strip wound hose 4 is disposed inside the bellows 2 and has, in the embodiment shown, a helical winding 41 with a substantially S-shaped cross-sectional profile 42 by means of which neighboring elements of the winding 41 engage each other (FIGS. 3 to 5). Alternatively, the strip wound hose can be formed by a plurality of annular segments with a cross-section corresponding to that of the helical winding 41 by means of which axially neighboring annular segments of the strip wound hose engage each other (not shown).

Spacers 5 formed by strips are disposed in the annular space between the bellows 2 and the strip wound hose 4 for damping same (FIGS. 8–15) and are held at least at the connecting ends 6 of the bellows 2 by cylindrical rings 7. The rings 7 also fix the knitted tube 3 and the entire pipe element 1 in an exhaust pipe of a motor vehicle. The corrugations 8 of the bellows 2 in accordance with FIG. 1 have a constant diameter, and the end corrugations 8a of the bellows 2 shown in FIG. 2 have a smaller diameter than the other corrugations 8 and are stepped-down in diameter from the corrugations 8 toward the rings 7 disposed at the connecting ends 6 of the bellows 2.

FIG. 3 shows a detailed view of the cross-sectional profile 42 of a helical winding 41 of the strip wound hose 4 by means of which axially neighboring elements 41a, 41b, 41c of the winding 41 engage each other (FIG. 5). The substantially S-shaped cross-sectional profile 42 of the winding 41 has a central section 43 each end of which joins onto a bar 44 with both bars 44 extending in the axial direction of the strip wound hose 4. Each bar 44 has an adjacent bridge 45 substantially extending in a radial direction of the strip wound hose 4 to each of which an end bar 46 is adjacent which extend toward the central section 43 and which are disposed in the axial direction of the strip wound hose 4, parallel to the bars 44.

To provide large axial, radial and in particular angular flexibility of the strip wound hose 4 while maintaining good decoupling properties for vibrations in the high and also low frequency ranges, the radial separation D between the bars 44, 46 is larger than the radial thickness d of the end bars 46 and the axial separation L between the central section 43 and the bridges 45 is larger than the axial length l of the end bars 46. In the embodiment shown, the radial separation D between the bars 44, 46 is approximately twice the radial thickness d of the end bars 46 and the axial separation L between the bridges 45 and the central section 43 is approximately 1.5 times the axial length l of the end bars 46.

The design of the cross-sectional profile 42 of the helical winding 41 of the strip wound hose 4 (FIG. 5) ensures that neighboring elements 41, 41b and 41b, 41c of the winding 41 engage each other with axial and radial play. Neighboring elements 41a, 41b, 41c can move axially by an amount (L-l) and radially by an amount (D-d). In particular, angular motion through an angle α is also possible and depends on the respective ratios L/l and D/d.

Figure 6:
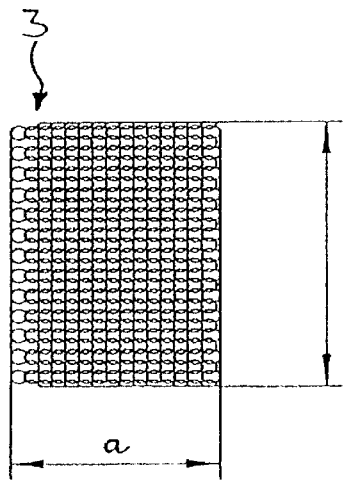
FIG. 6 shows a section of the knitted tube of the pipe element in accordance with FIG. 1 or 2 in the compressed state.
Figure 7:
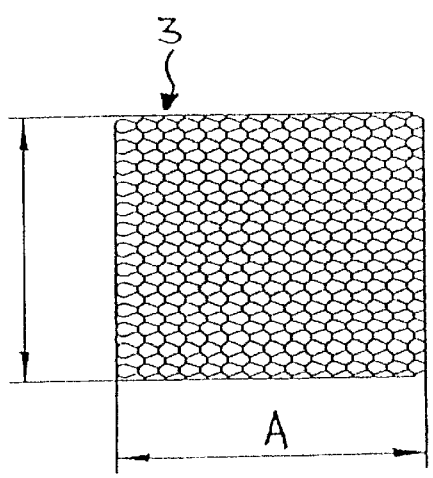
FIG. 7 shows the knitted tube in accordance with FIG. 6 which is in the uncompressed state.

FIGS. 6 and 7 show a section of the knitted tube 3 provided to protect the pipe element 1 (FIGS. 1, 2) from external influences in the compressed (FIG. 6) and in the uncompressed (FIG. 7) states. The knitted tube 3 (FIGS. 1, 2) which abuts the radially outer crests 8, 8a of the bellows 2 is made e.g. of wire by forming similar meshes extending in the axial direction of the pipe element 1, thereby producing good flexibility, in particular in the axial direction, but also with respect to radial and angular motion, such that the high flexibility of the bellows 2-strip wound hose 4 connection remains substantially unimpaired. FIGS. 6 and 7 show that the knitted tube 3 can be compressed from a length A (FIG. 7) to a length a (FIG. 6) by compressing the mesh with the knitted tube 3 always reliably surrounding the bellows 2 (FIGS. 1, 2).

FIGS. 8 through 15 shows different embodiments of the spacers 5 provided between the bellows 2 and the strip wound hose 4 for preventing noise associated with their mutual contact.

Figure 2:
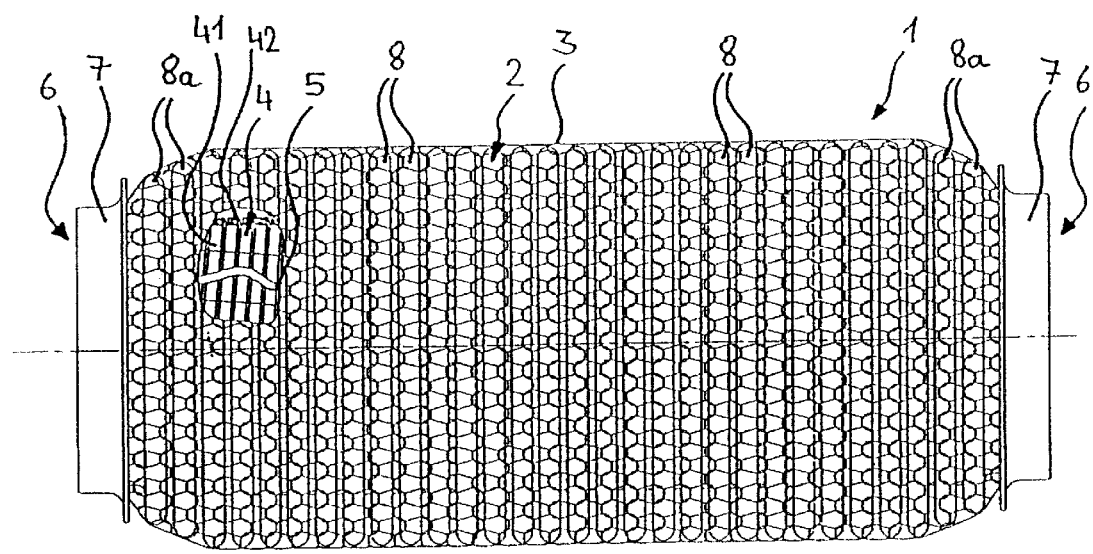
FIG. 2 shows an alternative embodiment of the pipe element according to FIG. 2.
Figure 8:
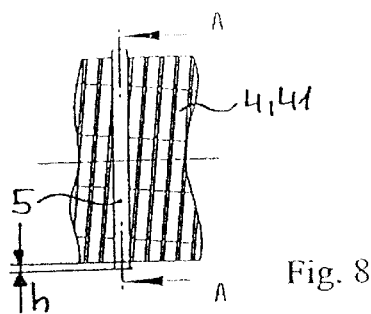
FIG. 8 shows a side view of a spacer disposed about a strip wound hose whose strips extend in a radial direction.
Figure 10:
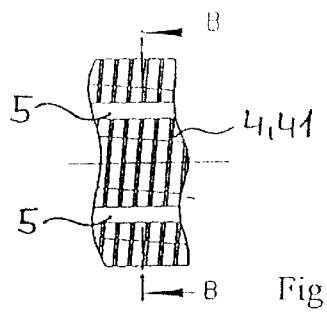
FIG. 10 shows a side view of a spacer disposed about a strip wound hose whose strips extend in an axial direction.
Figure 9:
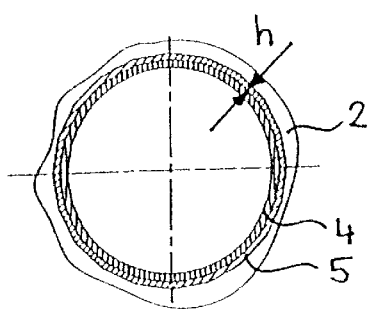
FIG. 9 shows a cross-section thereof.
Figure 11:
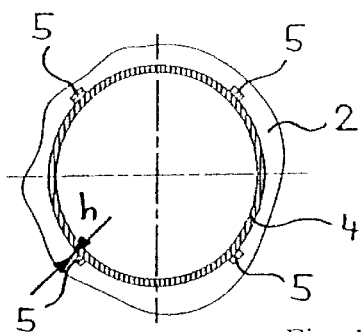
FIG. 11 shows a cross-section thereof.
Figure 12:
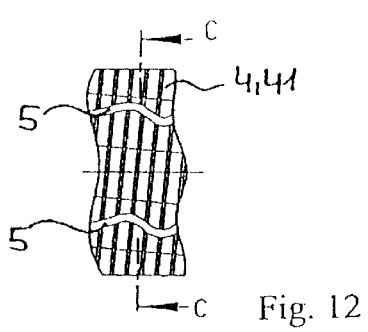
FIG. 12 shows a variant of FIG. 10.
Figure 14:
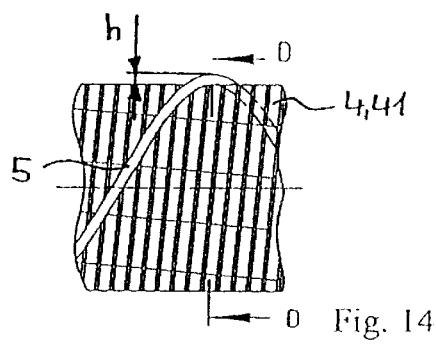
FIG. 14 shows a side view of a spacer disposed about a strip wound hose whose strips extend helically about the jacket of the strip wound hose.
Figure 13:
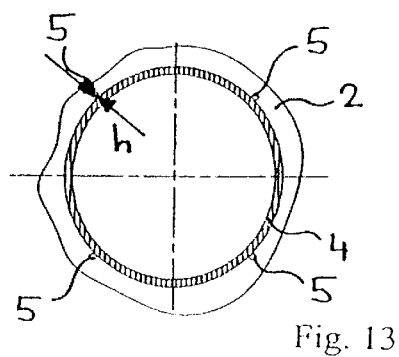
FIG. 13 shows a cross-section thereof.
Figure 15:
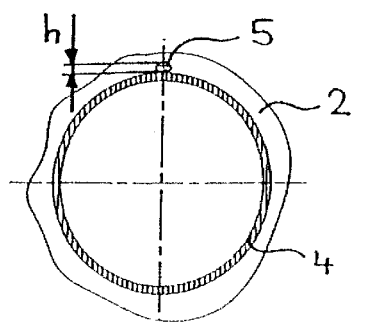
FIG. 15 shows a cross-section thereof.

FIGS. 8 and 9 show a spacer 5 formed by strips, wherein the strips are disposed annularly about the strip wound hose 4 with an axial separation from each other and within the bellows 2 (FIGS. 1, 2). The spacers 5 in accordance with FIGS. 10 and 11 are strips which extend in the axial direction of the strip wound hose 4 and are disposed at mutual peripheral separations. The strips of the spacers 5 shown in FIGS. 12 and 13 are disposed in a meandering fashion in the axial direction of the strip wound hose 4 and are also separated from each other in the peripheral direction. A helical spacer 5, threaded about the jacket of the strip wound hose 4 is shown in FIGS. 14 and 15. In the embodiments shown, the height h of the spacers 5 is e.g. approximately 5 mm.

The embodiments shown in FIGS. 8 through 15 can of course be combined to precisely dampen particularly vibration-sensitive regions of the strip wound hose 4. Moreover, further spacers can be provided in addition to those shown (spacers 5) whose strips extend e.g. in different orientations, e.g. cross one another.

Figure 16:
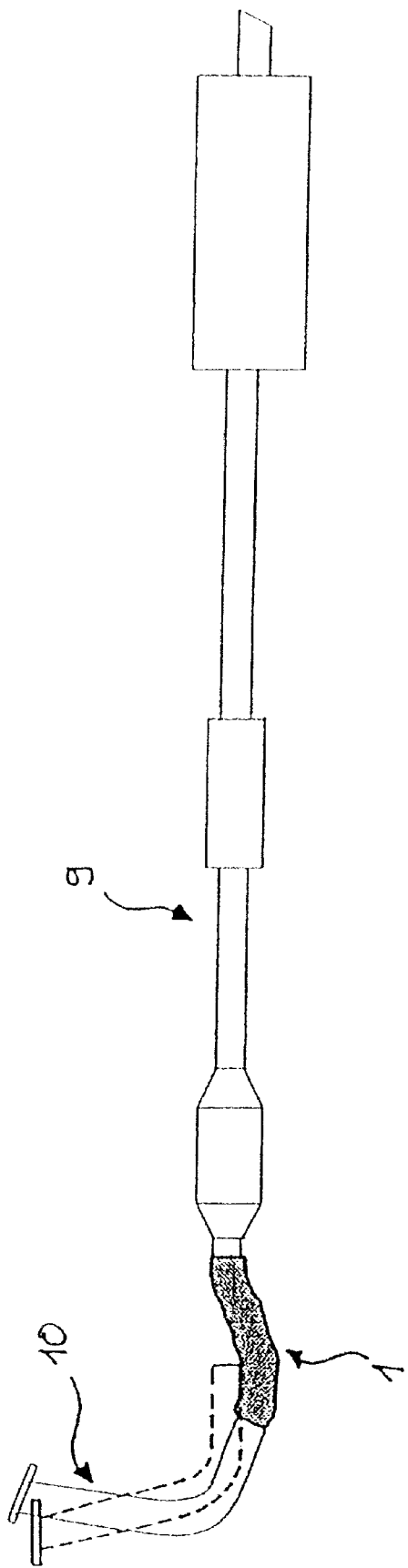
FIG. 16 shows a side view of a pipe element in accordance with FIG. 1 or 2 which is installed in the exhaust pipe of a motor vehicle.

FIG. 16 shows a flexible pipe element 1 installed in an exhaust pipe 9 of a motor vehicle (not shown) which connects the exhaust pipe 9 with a connecting piece 10 of the engine (not shown). Due to its overall stiffness of approximately 5 N/mm and its associated increased flexibility, the pipe element 1 permits a rigid mounting of the exhaust pipe 9 to the underbody of the motor vehicle by reliably accepting thermally or mechanically produced distance and angle changes of the engine connection piece 10 (shown as dashed lines) with respect to the fixed exhaust pipe 9.

LIST OF REFERENCE NUMERALS 1 flexible pipe element
2 bellows
3 knitted tube
4 strip wound hose
5 spacer
6 connecting ends of the pipe element
7 rings
8, 8a bellow corrugations
9 exhaust pipe
10 connecting piece
41 helical winding of the strip wound hose
41a–c elements of the helical winding
4" cross-section of the winding
43 central section
44 bar
45 bridge
46 end bar
D radial separation of the bars
D radial thickness of the end bars
L axial separation between central section and bridges
L axial length of the end bars
H height of the spacer

What is claimed is:

1. A flexible pipe element suitable for use in an exhaust pipe system of motor vehicle combustion engines, the pipe element comprising:
   a bellows, said bellows being at least one of helically structured and corrugated;
   at least one strip wound hose coaxially adjacent to said bellows, said strip wound hose being at least one of spirally wound and structured from a plurality of adjacent annular segments;
   at least one spacer locally disposed between said bellows and said strip wound hose; and
   a knitted tube disposed about said bellows, said strip wound hose and said spacer, wherein the pipe element has a maximum rigidity of 5 N/mm.

2. The pipe element of claim 1, wherein a helical winding or an annular segment of said strip wound hose has a substantially S-shaped cross-sectional profile, said profile having a central section each end of which adjoins a bar, with each bar extending substantially in an axial direction to join a bridge, and each bridge extending in a substantially radial direction to join onto an end bar, with each end bar disposed substantially in an axial direction to extend towards said central section, wherein a radial separation (D) between said bar and an associated said end bar is larger than a radial thickness of said end bar, wherein an axial separation (L) between said central section and said bridge is greater than an axial length (l) of said end bar.

3. The pipe element the of claim 2, wherein said cross-sectional profile is mirror-symmetrical with respect to a center of said central section.

4. The pipe element of claim 2, wherein said bar and said end bar are mutually parallel and disposed in said axial direction.

5. The pipe element of claim 2, wherein said central section is a bridge disposed in said radial direction.

6. The pipe element of claim 2, wherein said central section is a bridge disposed at an inclination with respect to said radial direction.

7. The pipe element of claim 6, wherein said central section inclines towards each of a neighboring one of said bar.

8. The pipe element of claim 2, wherein said radial separation (D) between said bar and said end bar is between 1.1 to 3 times said radial thickness (d) of said end bar.

9. The pipe element of claim 2, wherein said radial separation (D) is between 1.2 to 2 times said radial thickness (d) of said end bar.

10. The pipe element of claim 2, wherein said axial separation (L) between said central section and said bridge is between 1.05 to 1.9 times said axial length (l) of said end bar.

11. The pipe element of claim 2, wherein said axial separation (L) is between 1.1 to 1.8 times said axial length (l) of said end bar.

12. The pipe element of claim 1, wherein said spacer has a height between 0.3 and 0.8 mm.

13. The pipe element of claim 12, wherein said height is approximately 0.5 mm.

14. The pipe element of claim 1, wherein said spacer is a strip.

15. The pipe element of claim 1, wherein said spacer is rigidly connected to at least one of said bellows and said strip wound hose at at least one connecting end of the pipe element.

16. The pipe element of claim 15, further comprising a cylindrical ring disposed an end of the pipe element for holding said spacer.

17. The pipe element of claim 1, wherein said spacer is disposed loosely between said bellows and said strip wound hose.

18. The pipe element of claim 14, wherein said spacer is disposed in said radial direction of said strip wound hose.

19. The pipe element of claim 14, wherein said spacer is disposed in said axial direction of said strip wound hose.

20. The pipe element of claim 14, wherein said spacer is disposed in a helical fashion about a jacket of said strip wound hose facing said bellows.

21. The pipe element of claim 14, wherein said spacer is disposed symmetrically about a jacket of said strip wound hose facing said bellows.

22. The pipe element of claim 14, wherein said spacer is disposed asymmetrically about a jacket of said strip wound hose facing said bellows.

23. The pipe element of claim 1, wherein said spacer is crisscrossed.

24. The pipe element of claim 1, wherein said spacer is disposed in several layers.

25. The pipe element of claim 1, wherein said spacer consists essentially of at least one of glass and mineral fibers.

26. The pipe element of claim 25, wherein a material of said spacer is a knitted fabric.

27. The pipe element of claim 25, wherein a material of said spacer is one of a fleece and a strip fleece.

28. The pipe element of claim 1, wherein said spacers consists essentially of metal.

29. The pipe element of claim 28, wherein said spacer consists essentially of at least one of wire, metal cushions, expanded material and metal foam.

30. The pipe element of claim 1, wherein said knitted tube produces a frictional force on said bellows of 0.5 to 5 N.

31. The pipe element of claim 30, wherein said knitted tube produces a frictional force on said bellows of approximately 1 to 3 N.

32. The pipe element of claim 1, further comprising means for fixing said knitted tube to connecting ends of the pipe element.

33. The pipe element of claim 32, wherein said fixing means comprise cylindrical rings.

34. The pipe element of claim 1, wherein said knitted tube consists essentially of temperature-resistant fiber material.

35. The pipe element of claim 1, wherein said knitted tube consists essentially of metal wire.

36. The pipe element of claim 1, wherein said knitted tube comprises a knitted fabric of one or more threads.

37. The pipe element of claim 1, wherein said of knitted tube comprises meshes extending substantially in said axial direction of the pipe element.

38. The pipe element of claim 1, wherein said bellows has a rigidity of approximately 2 to 5 N/mm.

39. The pipe element of claim 1, wherein said strip wound hose is disposed inside of said bellows.

* * * * *